May 5, 1959    R. T. HURLEY    2,884,661
METHOD AND APPARATUS FOR CRANKSHAFT CONSTRUCTION
Filed Feb. 27, 1953    3 Sheets-Sheet 1
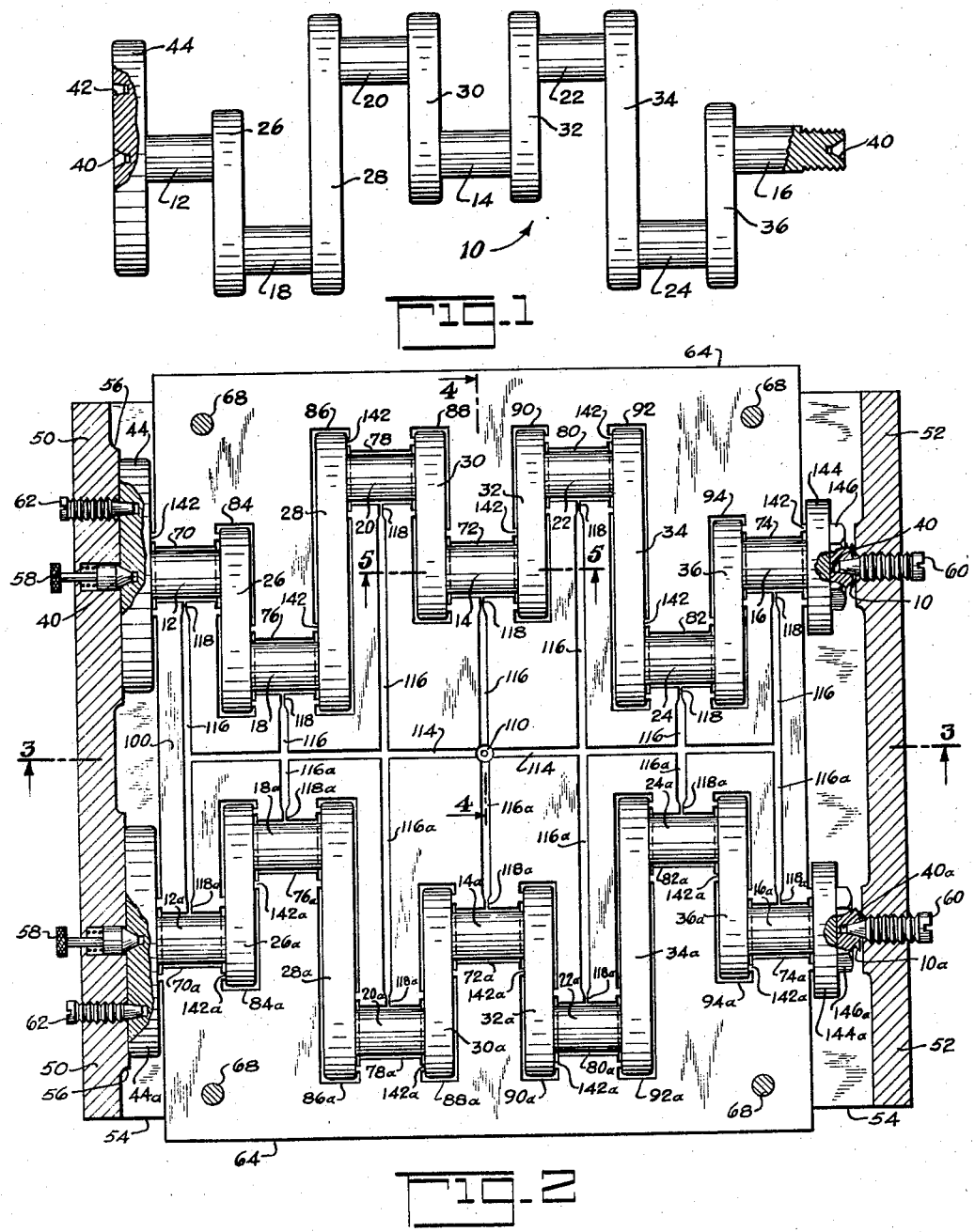
INVENTOR
ROY T. HURLEY
BY
ATTORNEY

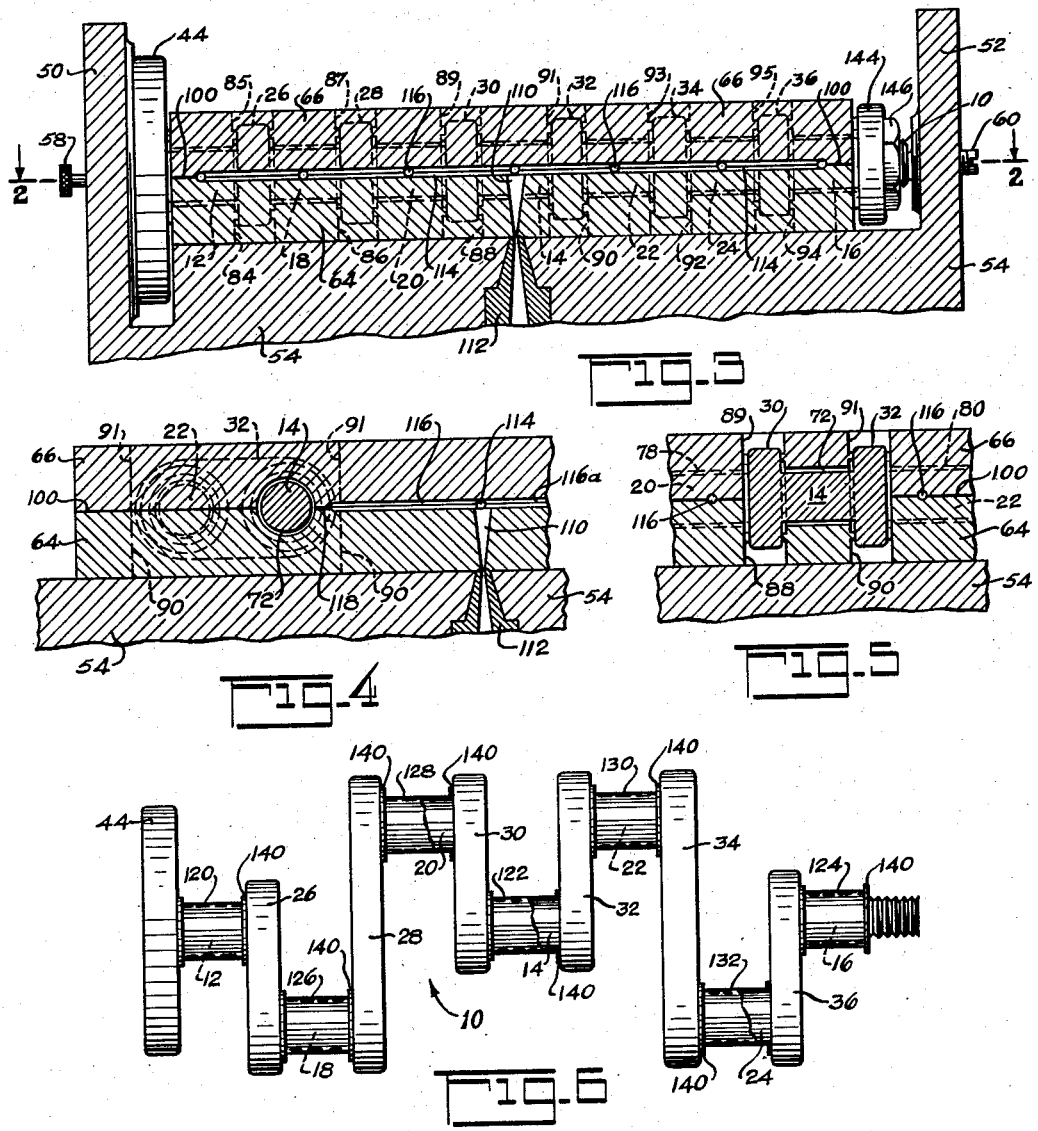

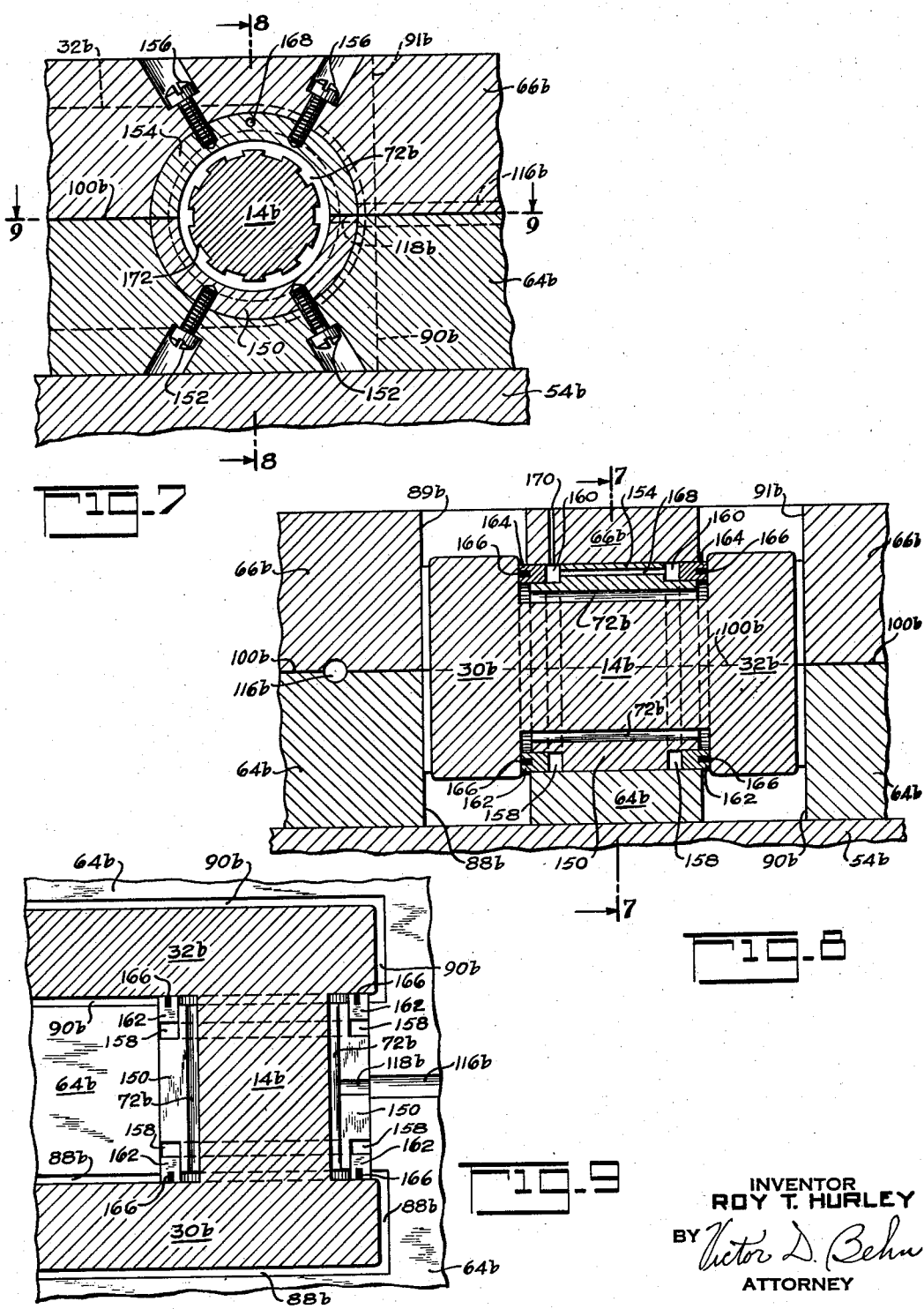

United States Patent Office 2,884,661
Patented May 5, 1959

2,884,661

METHOD AND APPARATUS FOR CRANKSHAFT CONSTRUCTION

Roy T. Hurley, Westport, Conn., assignor to Curtiss-Wright Corporation, a corporation of Delaware Application February 27, 1953, Serial No. 339,426

6 Claims. (Cl. 18—36)

This invention relates to crankshafts and is particularly directed to a composite crankshaft and bearing sleeve construction, to a method of fabricating such a composite crankshaft and/or to apparatus for molding bearing sleeves to and about the bearing portions of a crankshaft.

The crankshafts of most modern automobile engines comprise one-piece castings or forgings on which the crankshaft journal portions and crankpins are machined and ground to the required dimensional accuracy and surface finish. An object of this invention comprises the provision of a composite crankshaft and bearing sleeve construction wherein said crankshaft journal and crankpin machining and grinding are no longer required. A further object of the invention comprises the provision of a composite crankshaft and bearing sleeve construction in which plastic bearing sleeves are molded about each crankshaft journal portion and/or about each crankshaft crankpin. Still another object of the invention comprises the provision of a method of fabricating and an apparatus for fabrication of such a composite crankshaft and bearing sleeve construction. A plastic material, known as "nylon," which may be described as a synthetic linear condensation polyamide, has been found suitable for use as a bearing sleeve. The invention however is not limited to the use of nylon bearing sleeves since, as will appear, said sleeves could be made of any material which can be molded about crankshaft bearing portions and which has the necessary phyical characteristics for use as a crankshaft bearing sleeve.

As used in this specification and claims the phrase "crankshaft bearing portion" is intended to be broad enough to be generic to the main bearing or journal portions of the crankshaft and to the crankshaft crankpins.

Other objects of the invention will become apparent upon reading the annexed detailed description in connection with the drawing in which:

Fig. 1 is a schematic view of a crankshaft prior to the molding of bearing sleeves about its journal portions and crankpins in accordance with the invention;

Fig. 2 is a plan view of a multi-cavity molding apparatus with the movable mold plate removed and illustrating two crankshafts (similar to the one illustrated in Fig. 1) disposed in position for molding plastic bearing sleeves about their bearing portions;

Fig. 3 is a sectional view taken along line 3—3 of Fig. 2;

Fig. 4 is a sectional view taken along line 4—4 of Fig. 2;

Fig. 5 is a sectional view taken along line 5—5 of Fig. 2;

Fig. 6 is a view similar to Fig. 1 but illustrating the crankshaft with the bearing sleeves molded thereon;

Fig. 7 is an enlarged view similar to Fig. 4 but illustrating a modified mold construction and taken along line 7—7 of Fig. 8; and Figs. 8 and 9 are sectional views taken along line 8—8 and line 9—9 respectively of Fig. 7.

The conventional automobile crankshaft comprises a one-piece forging or casting on which the crankshaft journal portions and crankpins are machined and ground to the required dimensional accuracy and surface finish. In accordance with the present invention a bearing sleeve is molded about each journal portion and crankpin of a crankshaft so as to eliminate the necessity for machining and grinding said journal portions and crankpins. For this purpose and in accordance with the invention, each crankshaft journal portion and crankpin is disposed in the cavity of a mold of molding apparatus for molding a bearing sleeve about each said journal portion and crankpin. The crankshaft and each mold cavity are so connected to the molding appartus that each mold cavity is disposed at the proper position relative to the crankshaft axis without any piloting of the walls of said mold cavity on the surface of the particular crankshaft bearing portion within said mold cavity. With this procedure and apparatus the axis of the outer surface of each molded bearing sleeve secured to and about a crankshaft bearing portion is properly positioned relative to the crankshaft axis independently of any small inexactness of said bearing portion in the as-cast or in the as-forged condition. The present invention thereby eliminates the need for machining and/or grinding the crankshaft bearing surfaces.

Fig. 1 schematically illustrates a crankshaft 10 having main bearing or journal portions and crankpins about which plastic bearing sleeves are to be molded in accordance with the invention. The crankshaft 10 comprises journal portions 12, 14, and 16 and crankpins 18, 20, 22 and 24 connected by crankarms or crankcheeks 26, 28, 30, 32, 34 and 36. The crankshaft 10 may be a one-piece precision casting or forging, for example, said crankshaft may be a precision casting such as is obtainable with a relatively new casting process called Shell Casting. This new casting process is described in Industrial Note No. 114 issued September 1951 by the U.S. Navy Department, Bureau of Ships and entitled "Plastic Bonded Shell Molding Simplified."

As illustrated, the crankshaft 10 is a four-throw crankshaft having three crankshaft journal portions with the four crankpins 18, 20, 22 and 24 all being coplanar with the crankshaft axis and with the crankpins 18 and 24 being 180° from the crankpins 20 and 22 relative to the crankshaft axis. As will be apparent, however, the invention is not limited to any specific crankshaft configuration. Thus the invention is equally applicable to crankshafts having a different number of journal portions, a different number of crankpins and/or a different relative angular arrangement of the crankpins.

In order to properly locate and position each crankshaft journal portion and crankpin relative to the axis of a mold cavity use may be made of the usual conically counterbored centering holes 40 in the ends of the crankshaft, said holes serving to locate and position the crankshaft axis. In addition a tapered hole 42 may be machined in the crankshaft flywheel-attaching flange 44 at a point spaced from the crankshaft axis to provide a reference point for locating and holding the crankshaft in a desired rotative position about its axis. The crankshaft centering holes 40 are generally provided for centering and holding the crankshaft during various machining operations thereon. Although the present invention eliminates the need for machining the crankshaft journal portions and crankpins, other machining operations may still be necessary, as for example, machining the crankshaft flywheel-attaching flange 44. Therefore, the centering holes 40 are not something which must be provided solely for the purposes of the present invention.

The molding apparatus of Figs. 2—5 comprises a frame structure having spaced arms 50 and 52 which extend from and are rigidly secured to a plastic injection moulding machine 54. The arms 50 and 52 are spaced apart a distance to receive the crankshaft 10 therebetween. The arm 50 has a machined surface 56 against which the machined end surface of the crankshaft flange 44 is disposed thereby accurately locating the various crankshaft bearing portions from the frame surface 56. The arms 50 and 52 have co-axial pins 58 and 60, respectively, each of said pins having conical ends adapted to enter the centering hole 40 in the adjacent end of the crankshaft. The pin 58 is spring pressed into its crankshaft centering hole 40 while the pin 60 is threaded in its frame arm 52 to force the crankshaft flange 44 against the frame surface 56 of the arm 50. The arm 50 also has a tapered pin 62 which is arranged to enter the tapered hole 42 in the crankshaft flywheel flange 44 for positioning and holding the crankshaft in a predetermined rotative position relative to the molding machine 54.

At this point it should be noted that means other than the centering holes 40 and centering pins 58 and 60 could be used for locating the crankshaft axis. For example, the periphery of the crankshaft flange 44 could be machined to fit within a cylindrical bore in the arm 50 for centering the crankshaft. Likewise, means other than the tapered hole 42 and pin 62 could be used for locating and holding the crankshaft in a predetermined rotative position about its axis. Thus the crankshaft centering holes 40 and centering pins 58 and 60 and the crankshaft angular locating and holding means 42 and 62 constitute but one of many mechanical expedients which could be used for locating and holding a crankshaft with each of the crankshaft bearing portions disposed in the proper position relative to its mold cavity without any piloting of the mold cavity walls on said crankshaft bearing portion.

The molding machine 54 has a fixed mold plate 64 secured thereto and has a movable mold plate 66 which is movable toward and away from the fixed mold plate 64. Guide pins 68 are provided for guiding the motion of the movable mold plate 66 relative to the fixed mold plate 64 for accurate positioning of said plates relative to each other. Each mold plate 64 and 66 has semi-cylindrical cavities, each said cavity forming half of one of the mold cavities 70, 72, 74, 76, 78, 80 and 82 within which the crankshaft bearing portions 12, 14, 16, 18, 20, 22 and 24, respectively, are adapted to be received, there being one mold cavity for each crankshaft bearing portion about which a bearing sleeve is to be molded. Also the mold plates 64 and 66 have slots 84 and 85, respectively, for receiving the crankcheek 26 therein, one-half of said crankcheek being received in each of said slots. Similarly the other crankcheeks 28, 30, 32, 34 and 36 are respectively received in pairs of slots 86 and 87, 88 and 89, 90 and 91, 92 and 93, and 94 and 95 in the mold plates.

The upper surface 100 (as viewed in Fig. 3) of the fixed mold plate is a plane surface within which the axis of the crankshaft centering pins 58 and 60 is disposed, and the crankshaft 10 is held in position on the frame arms 50 and 52 by the pins 58, 60 and 62 so that the plane defined by its axis and the axes of its crankpins is co-planar with the upper or plane surface 100 of the fixed mold plate 64. Also each of the mold cavities 70, 72, 74, 76, 78, 80 and 82 is so disposed that the axis of said cavity has the same disposition relative to the axis of the crankshaft centering pins 58 and 60 as the disposition, relative to the crankshaft axis, desired of the crankshaft bearing sleeve to be molded in each said cavity. In addition each mold cavity is spaced from the molding machine frame surface 56 the same distance the crankshaft bearing surface to be received within said cavity is spaced from the end surface of the crankshaft flywheel flange 44. With this disposition of the mold cavities and without any piloting of the mold cavity walls on their respective crankshaft bearing portions each said mold cavity and its axis is properly located relative to the crankshaft 10 and its axis when said crankshaft is disposed and held in position on the molding machine arms 50 and 52 by pins 58, 60 and 62.

The fixed mold plate 64 has a sprue passage 110 which registers with a nozzle 112 of the injection molding machine 54, said sprue passage extending to the upper surface 100 of said plate. Two main runner passages 114 extend from the sprue passage and a plurality of secondary runner passages 116 extend from the sprue passage and the main runner passages toward the mold cavities. Each of said runner passages is formed by a semi-cylindrical groove along the surface 100 of the fixed mold plate 64 and by a facing semi-cylindrical groove along the adjacent surface of the movable mold plate 66. Each secondary runner passage 116 is connected to its mold cavity by a restricted or gate passage 118 formed by a groove in the surface 100 of the fixed mold plate.

In order to place the crankshaft 10 in position on the plastic injection molding machine 54, the movable mold plate 66 must first be in a retracted position away from the fixed mold plate 64. After the crankshaft is secured in position on the injection molding machine 54 by the pins 58, 60 and 62, said machine is operated to bring the mold plate 66 against the fixed plate 64 and then to force melted plastic material under pressure through its nozzle 112, the sprue passage 110, the runner passages 114 and 116 and thence through the gate passages 118 into the mold cavities. This operation of the molding machine 54 is similar to the operation of conventional plastic injection molding machines. Thus, as is conventional in plastic injection molding machines, the machine 54 may include hydraulic mechanism (not illustrated) for moving the movable mold plate 66 and may also include a piston-type plunger (not illustrated) for forcing the melted plastic material through the nozzle 112.

The melted plastic material forced into each mold cavity cools to form a plastic bearing sleeve about the crankshaft bearing portion within said cavity. Thus bearing sleeves 120, 122, 124, 126, 128, 130 and 132 (shown in Fig. 6) are formed about the crankshaft bearing portions 12, 14, 16, 18, 20, 22 and 24 respectively. Since the axis of each mold cavity is accurately positioned with reference to the crankshaft axis without any piloting of the walls of each mold cavity on the crankshaft bearing portion therein, the axis of the outer surface of each bearing sleeve is accurately positioned with respect to said crankshaft axis regardless of any small inexactness of crankshaft bearing portion in the as-cast or the as-forged condition of said bearing portion. Thus applicant's provision of said plastic bearing sleeves eliminates any need of machining and/or grinding said crankshaft bearing portions.

After the plastic material has cooled sufficiently in the mold cavities, the upper mold plate 66 is retracted and then, after first withdrawing the pins 58, 60 and 62, the crankshaft with its plastic bearing sleeves is removed from the fixed mold plate 64. Because of the semi-cylindrical shape of the mold cavities in each mold plate 64 and 66 no knockout pins are necessary for separating the bearing sleeves from their respective molds. Also, as is conventional in plastic injection molding, the temperature of the walls of each mold cavity may be controlled by the circulation of a heat exchange medium through passages (not shown) in the mold plates 64 and 66. The plastic material in the sprue, runner and gate passages will come with the bearing sleeves upon removal of the crankshaft from the mold cavities. This sprue, runner and gate passage plastic material can readily be cut off at the junction of each gate passage material with its bearing sleeve. In addition, any projecting surface roughness of a bearing sleeve along the junction or parting line of the mold plates 64 and 66 can readily be removed, for example, by a smoothing or polishing operation.

Fig. 6 illustrates a crankshaft 10 with bearing sleeves 120, 122, 124, 126, 128, 130 and 132 molded in place in accordance with the invention. Preferably and as illustrated each bearing sleeve has a radially-outwardly extending flange 140 at each end. This is accomplished by providing each mold cavity with a profile similar to that of said bearing sleeves as best seen in Figs. 2 and 5. With the flanged bearing sleeve construction, the bearing sleeve flanges 140 serve to prevent rubbing contact of, for example, the connecting rods with the adjacent crankcheeks.

As best seen in Fig. 2 the runner and sprue passages for the plastic material are all disposed along one side of the crankshaft 10. Therefore, as illustrated, the mold plates 64 and 66 can readily be made to include mold cavities for a second crankshaft with said second crankshaft mold cavities being fed plastic material from the same sprue passage 110 and the same main runner passages 114 as feed the mold cavities of the crankshaft 10. In Fig. 2, this second crankshaft and its parts, its supporting means, its mold cavities and the passages for feeding plastic material into its mold cavities from the sprue passage 110 are all designated by the same reference numerals but with a subscript $a$ added thereto as the corresponding parts associated with the first crankshaft. Accordingly, no further description of this added structure is necessary. With this added structure bearing sleeves may be simultaneously molded about the bearing portions of two crankshafts.

The operating pressure of plastic injection molding machines is quite high and may for example be of the order of 10,000 pounds per square inch. Accordingly, the ends of each mold cavity must be sealed to permit said pressure to be maintained within the mold cavity and to prevent the plastic material from squirting out from said cavity between the end walls of said cavity and, for example, in the case of the mold cavity 72, the adjacent crankcheeks. A seal means for each mold cavity is schematically indicated in Figs. 2–5 by semi-circular lands 142 on each of the mold plates 64 and 66, a pair of such semi-circular lands or other seal means being disposed about each end of each mold cavity for engagement with an adjacent transverse surface on the crankshaft. Thus in the case of the mold cavity 70 the lands 142 at the two ends of said cavity engage the crankshaft flywheel flange 44 and the crankcheek 26 for sealing the ends of said cavity. In this connection, it should be noted that the crankshaft journal portion 16 does not have a transverse crankshaft surface, such as a crankcheek on the flywheel 44 at one of its ends against which the adjacent end wall of the mold cavity 74 could be sealed. Accordingly, a plate 144 is temporarily secured to the crankshaft, as by a nut 146, adjacent to said one end of the journal portion 16 and against which one end wall of the mold cavity 74 is sealed during the molding operation by a seal means 142. After the bearing sleeve 124 has been molded about the journal portion 16 the plate 144 is removed.

Figs. 7 to 9 are enlarged views corresponding to Figs. 4 and 5 respectively and illustrating a modified mold plate construction so as to incorporate loadable end seal rings for each mold cavity in lieu of the seal lands 142. Figs. 7 to 9 also illustrate a modified crankshaft bearing portion construction. The modified construction of Figs. 7 to 9 is illustrated in connection with a particular mold cavity and its crankshaft bearing portion. Obviously, however, each of the other mold cavities illustrated in Figs. 2–5 and their respective bearing portions may be similarly modified. Those parts of Figs. 7 to 9 corresponding to the parts of Figs. 4 and 5 have been designated by the same reference numerals but with a subscript $b$ added thereto.

In Figs. 7 to 9, the fixed mold plate 64$b$ has a semi-cylindrical member 150 secured thereto as by screws 152, the member 150 forming the lower (as viewed in Figs. 7 and 8) half of the mold cavity 72$b$. Similarly, the movable mold plate 66$b$ has a semi-cylindrical member 154 secured thereto as by screws 156, the member 154 forming the other half of the cavity 72$b$. Each of the members 150 and 154 has a radially-outwardly projecting flange intermediate its ends thereby forming semi-circular channels 158 and 160, respectively, in the mold plates 64$b$ and 66$b$ at each end of the cavity 72$b$. Each semi-circular channel 158 in the fixed mold plate 64$b$ registers with the semi-circular channel 160 in the movable mold plate to form an annular channel. A seal half-ring 162 is slidingly fitted in each semi-circular channel 158 and a seal half-ring 164 is slidingly fitted in each semi-circular channel 160 such that each half-ring 162 and the adjacent half-ring 164 form a complete seal ring. The inner and other circumferential surfaces of each seal ring 162, 164 and the surfaces of the annular channel engaged thereby are machined cylindrical to provide a fluid tight sliding fit therebetween. Also each half-ring 162 and 164 has accurately machined ends so that the two halves of each seal ring abut in fluid tight relation. The outer end of each seal half-ring may have a covering layer and/or insert 166 of relatively soft material such as lead.

Mechanical and/or hydraulic means may be provided for loading or urging each seal ring 162, 164 tightly against the adjacent crankcheek surface 30$b$ or 32$b$ when the movable mold plate 66$b$ is moved against the fixed plate 64$b$. Thus, as illustrated, a passage 168 connects the bottoms of the two annular channels 158, 160 and a fluid pressure supply passage 170 connects with the bottom of one of said annular channels. Upon the supply of a fluid under pressure through the passage 170, said fluid acts against both composite seal rings 162, 164 to urge said seal rings axially away from each other against the adjacent crankcheeks 30$b$ and 32$b$. The seal rings 162, 164 thereby prevent the escape of plastic material from either end of the mold cavity 72$b$ between the end surfaces of said cavity and the adjacent crankcheek surfaces. Also, since the seal rings 162, 164 have a larger internal diameter than that of the cylindrical mold cavity surface formed by the members 150 and 154, said seal rings form the mold cavity wall for the outer peripheries of the end flanges (similar to the flanges 140 illustrated in Fig. 6) to be formed on the bearing sleeve.

In order to positively lock each plastic bearing sleeve to its respective crankshaft bearing portion, said crankshaft bearing portion may have appropriate grooves into which the plastic material is forced during the molding operation. Thus in Fig. 7 the crankshaft bearing portion 14$b$ is illustrated as having axially extending grooves 172 into which the plastic material flows during the plastic bearing sleeve molding operation whereby said sleeve and bearing portion are locked against relative rotation. The grooves 172 are formed in the crankshaft bearing piston 14$b$ during the crankshaft forging or casting operation and similar grooves may be formed in the other crankshaft bearing portions.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Apparatus for molding a plastic bearing sleeve about each bearing portion of a crankshaft having at least one journal portion co-axial with the crankshaft axis and at least one crankpin; said apparatus comprising a multi-cavity mold structure secured thereto and having a bearing sleeve mold cavity for each crankshaft bearing portion; means engageable by centering means at the ends of and co-axial with the axis of the crankshaft and by a crankshaft formation spaced from the crankshaft axis for supporting and holding the crankshaft on said apparatus so that each crankshaft bearing portion is disposed in one of said cavities and so that, independently of any piloting of any of said molds on the surfaces of their respective crankshaft portions, the crankshaft is disposed in a predetermined rotative position relative to said apparatus and the crankshaft axis has a predetermined position relative to said apparatus; annular seal means disposed around the ends of each mold cavity; means for forcing the annular seal means at the ends of each mold cavity axially away from each other into contact with adjacent transverse surfaces on the crankshaft; and means for introducing plastic material into each of said mold cavities for molding a plastic bearing sleeve about each said crankshaft bearing portion.

2. Apparatus for molding a plastic bearing sleeve about each bearing portion of a crankshaft having at least one journal portion co-axial with the crankshaft axis and at least one crankpin; said apparatus comprising a multi-cavity mold structure secured thereto and having a bearing sleeve mold cavity for each crankshaft bearing portion; spaced axially-alined means engageable with centering holes at the ends of and on the axis of the crankshaft and means laterally-spaced from said axially-alined means and engageable with a crankshaft formation spaced from the crankshaft axis for supporting and holding the crankshaft on said apparatus so that each crankshaft bearing portion is disposed in one of said mold cavities and so that, independently of any piloting of any of said molds on the surfaces of their respective crankshaft bearing portions, the crankshaft is disposed in a predetermined rotative position relative to said apparatus and the crankshaft axis has a predetermined position relative to said apparatus; and means for introducing plastic material into each of said mold cavities for molding a plastic bearing sleeve about each said crankshaft bearing portion.

3. Apparatus for molding a plastic bearing sleeve about each bearing portion of a crankshaft having at least one journal portion co-axial with the crankshaft axis and at least one crankpin; said apparatus comprising multi-cavity mold structure secured thereto and having a bearing sleeve mold cavity for each said crankshaft bearing portion, each said mold cavity having the profile to form a cylindrical bearing sleeve with a radially outwardly extending flange at each end; spaced axially-alined means engageable with centering means at the ends of and co-axial with the crankshaft axis and means laterally-spaced from said axially-alined means and engageable with a crankshaft formation laterally spaced from the crankshaft axis for supporting and holding the crankshaft on said apparatus so that each crankshaft bearing portion is disposed in one of said mold cavities and so that, independently of any piloting of any of said molds on the surfaces of their respective crankshaft bearing portions, the crankshaft is disposed in a predetermined rotative position relative to said apparatus and the crankshaft axis has a predetermined position relative to said apparatus; annular seal means disposed around each end of each mold cavity with each said annular seal means having an internal diameter larger than the internal diameter of its mold cavity between the ends of said cavity to provide the flange forming portion of said mold cavity at its end of said mold cavity; and means for introducing plastic material into each mold cavity for molding a flanged plastic bearing sleeve about each said crankshaft bearing portion.

4. Apparatus for molding a plastic bearing sleeve about a crankpin of a crankshaft; said apparatus comprising a mold having a bearing sleeve mold cavity; spaced axially-alined means engageable with centering means at the ends of and co-axial with the crankshaft axis and means laterally-spaced from said axially-alined means and engageable with a crankshaft formation laterally spaced from the crankshaft axis for supporting and holding the crankshaft relative to said mold so that its said crankpin is disposed in said mold cavity and so that, independently of any piloting of said mold on said crankpin, the crankshaft is disposed in a predetermined rotative position relative to said apparatus and the crankshaft axis has a predetermined position relative to said apparatus; and passage means for introducing a plastic material into said mold cavity for molding a plastic bearing sleeve about said crankpin.

5. The method of forming and securing a bearing sleeve about a crankshaft crankpin comprising the steps of disposing a crankshaft crankpin in the cavity of a bearing sleeve mold and supporting the crankshaft relative to the mold by utilizing centering means at the ends of and co-axial with the axis of the crankshaft and a crankshaft formation spaced from the crankshaft axis so that, independently of any piloting of said mold on the surface of said crankpin, said crankshaft is disposed in a predetermined rotative position relative to said mold and the crankshaft axis has a predetermined position relative to the axis of said mold; and then, while said crankshaft is so supported, molding a bearing sleeve within said mold about said crankpin.

6. The method of forming and securing a bearing sleeve about each bearing portion of a crankshaft having at least one journal portion co-axial with the crankshaft axis and at least one crankpin; said method comprising the steps of simultaneously disposing each said crankshaft bearing portion in the cavity of a bearing sleeve mold while utilizing centering means at the ends of and co-axial with the axis of said crankshaft and a crankshaft formation spaced from the crankshaft axis for locating each said crankshaft bearing portion in its respective mold cavity so that the axis of each said cavity is disposed in a predetermined position relative to the crankshaft axis independently of any piloting of each mold on the surface of its associated crankshaft bearing portion; and, while said crankshaft is so supported, molding a bearing sleve within each mold about its associated crankshaft bearing portion.

References Cited in the file of this patent

UNITED STATES PATENTS

| | | |
|---|---|---|
| 1,692,340 | Lattin | Nov. 20, 1928 |
| 2,014,225 | Campbell | Sept. 10, 1935 |
| 2,103,185 | Rumpler | Dec. 21, 1937 |
| 2,247,995 | Gilbert | July 1, 1941 |
| 2,326,381 | Milligan et al. | Aug. 10, 1943 |
| 2,334,930 | Huddle | Nov. 23, 1943 |
| 2,351,454 | Pereles | June 13, 1944 |
| 2,497,914 | Sawyer | Feb. 21, 1950 |
| 2,596,993 | Gookin | May 20, 1952 |
| 2,666,677 | Miller | Jan. 19, 1954 |
| 2,730,003 | Loney | Jan. 10, 1956 |